United States Patent [19]

Grossi et al.

[11] 4,378,447

[45] Mar. 29, 1983

[54] CATIONIC AMINE MODIFIED ASPHALT COMPOSITIONS

[75] Inventors: Anthony V. Grossi, Newark; Leon A. Hagelee, Minerva Park; Louis T. Hahn, Newark; Alfred Marzocchi, Newark, all of Ohio

[73] Assignee: Owens-Corning Fiberglas Corporation, Toledo, Ohio

[21] Appl. No.: 329,897

[22] Filed: Dec. 11, 1981

[51] Int. Cl.³ ............................................ C08F 226/02
[52] U.S. Cl. .................................................. 525/54.5
[58] Field of Search .................. 525/54.5; 106/273 N; 527/500

[56] References Cited

U.S. PATENT DOCUMENTS 4,166,752  9/1979  Marzocchi et al. .
4,273,588  6/1981  Marzoccho et al. ........... 106/273 N
4,273,685  6/1981  Marzocchi et al. .

Primary Examiner—Theodore Morris
Attorney, Agent, or Firm—Ronald C. Hudgens; Robert F. Rywalski

[57] ABSTRACT

Blends of two chemically modified asphalts are provided. The first is the product produced by reacting asphalt with a vinyl aromatic monomer and an amine of an acyclic unsaturated hydrocarbon, and the second is the product produced by reacting asphalt with a vinyl aromatic monomer and a rubbery polymer. These asphalts are useful for road construction, repair and maintenance as well as a coating for various substrates including cementitious substrates, glass and metal.

8 Claims, No Drawings

CATIONIC AMINE MODIFIED ASPHALT COMPOSITIONS

CROSS-REFERENCES

The present application is related to application U.S. Ser. No. 329,901 and U.S. Ser. No. 329,900, all of which are concurrently being filed.

TECHNICAL FIELD

The present invention relates to asphalt compositions, and more particularly it relates to chemically modified asphalt compositions. Even yet more particularly, the present invention relates to amine modified asphalts.

BACKGROUND, SUMMARY AND INDUSTRIAL EXPLOITATION

Asphalt has been employed for numerous and wide variety of applications for many years. One of the problems encountered with asphalt is that its adhesion to various substrates and especially to aggregate needs to be improved. Other deficiencies in the properties of unmodified asphalt which are satisfied by the composition of the present invention include poor strength, low temperature brittleness, poor adhesion, excessive flow at high temperatures, variability in properties and poor coating of wet surfaces.

Thus, in accordance with the present invention, there is provided an improved asphalt composition which is a blend of two chemically modified asphalt compositions. The first chemically modified asphalt composition is the product produced by reacting asphalt with a vinyl aromatic monomer and an amine of an acyclic unsaturated hydrocarbon, and the second chemically modified asphalt is the product produced by reacting asphalt with a vinyl aromatic monomer and a rubbery polymer.

While the chemically modified asphalt product produced by reacting asphalt with a vinyl aromatic monomer and an amine of an acyclic unsaturated hydrocarbon has many desirably properties, it needs to be improved with respect to providing more flexibility and durability, higher strength and better high temperature flow properties. By blending with the above chemically modified asphalt, a chemically modified asphalt product produced by reacting asphalt with a vinyl aromatic monomer and a rubbery polymer, the blended composition has increased flexibility, improved strength, reduced high temperature flow, increased durability, and improved compatibility with polymers. These compositions will find utility for a wide variety of purposes. They, for example, will find application in the highway and bridge construction repair and maintenance areas as, for example, crack and pothole fillers, joint sealers, and water resistant membranes, and as cut-backs with the compositions being used alone or, if desired, further blended with conventional asphalts. These compositions can be formed into emulsions either with or without emulsifiers to form a rapid set emulsion, having utility for chip and seal applications, or as a cold overlay. Generally, it will be preferred to use conventional emulsifiers in forming such emulsions, and most desirably, non-ionic surfactants. The compositions may also be employed as corrosion resistant and/or water resistant coatings for metals and as coatings and/or impregnants for glass, especially glass fibers. Such coated or impregnated glass fibers will show outstanding compatibility with conventional asphalt and consequently will serve as outstanding reinforcements for such asphalts.

DESCRIPTION

The second above-indicated chemically modified asphalt which is employed in the practice of this invention is not per se novel and is well-known in the art. These chemically modified asphalts essentially comprise the reaction product of asphalt, a vinyl aromatic monomer, and a rubbery polymer. The chemically modified asphalt is obtained by reacting the constituents for a time, preferably about 20 hours, and at a temperature, preferably about 170° C., sufficient for the vinyl aromatic monomer and rubbery polymer to react with the asphalt. Typically, the vinyl aromatic monomer is employed in an amount corresponding to about 0.5 to about 35% by weight of the asphalt, and the rubbery polymer is used in an amount ranging from about 0.5 to about 30% by weight based on the weight of asphalt.

Asphalt materials which are suitable preferably are those which are typically used for road paving, repair and maintenance purposes. Thus, asphalt includes natural asphalt, petroleum asphalt and petroleum tar. The natural asphalts include, for example, asphaltite, such as Gilsonite, grahamite and glancepitch, lake asphalt, such as Trinidad asphalt, and rock asphalt. The petroleum asphalt that may be used includes straight asphalt obtained by distillation of a crude oil, blown asphalt, produced by blowing an oxygen-containing gas into straight asphalt, and solvent extracted asphalt. The petroleum tar that may be used includes coal tar and oil gas tar. Tar pitch is equally suitable. Additionally, the asphalts can be those that have been blown with steam, ammonia, or amines of the type set forth in U.S. Pat. No. 4,166,752. Preferably, the asphalt which will be employed is an asphalt cement of the type typically used for road paving, repair and maintenance purposes, such as for example, the AC-5, AC-10, AC-20 grades. Such asphalts typically have penetrations ranging between about 20 to about 200.

As the polymerizable vinyl monomer, use is preferably made of a monofunctional vinyl aromatic monomer having a general formula:

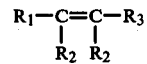

wherein $R_1$ is an aromatic group containing 6 to 12 carbon atoms, including a phenyl group, a substituted phenyl group wherein the substituent is any one of an amino group, a cyano group, a halogen group, a $C_1$ to $C_3$ alkoxy group, a $C_1$ to $C_3$ alkyl group, a hydroxy group, a nitro group, etc. $R_2$ is preferably hydrogen or lower alkyl e.g., a $C_1$ to $C_5$ alkyl and $R_3$ is hydrogen, lower alkyl or one of the following groups:

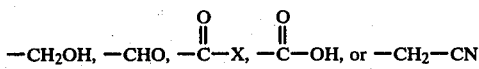

wherein X is halogen, and preferably chlorine or bromine. Styrene is preferred. In conjunction with the vinyl aromatic monomer as described above, a polyfunctional vinyl aromatic monomer containing 6 to 12 carbon atoms in the aromatic ring and two or more polymerizable vinyl groups chemically bonded to the aromatic ring can be employed. Preferred polyfunctional monomers are those having the general formula:

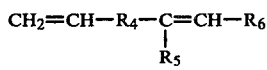

wherein $R_4$ is a divalent aromatic group containing 6 to 12 carbon atoms, and preferably a phenylene group; and, $R_5$ and $R_6$ have the same meaning as is described above with respect to $R_2$ and $R_3$, respectively for the monofunctional vinyl aromatic monomer. Illustrative of a suitable poly-functional vinyl aromatic monomer is divinyl benzene. When use is made of a polyfunctional vinyl aromatic monomer in combination with a monofunctional vinyl aromatic monomer such as styrene, generally the monofunctional vinyl aromatic monomer is present in a ratio of about 1:1 to 40:1 based on the weight of the polyfunctional vinyl aromatic monomer.

As the rubbery polymer, use can be made of a number of vulcanizable elastomeric materials well known to those skilled in the art. Included are natural rubbers as well as synthetic rubbers. Suitable are synthetic rubbers which are homopolymers of a conjugated diene (e.g., butadiene, isoprene, chloroprene, etc.) as well as various polymers which are substituted with a functional group containing a labile hydrogen atom. For example, various hydroxy, amino and like substituted homopolymers of conjugated dienes may likewise be used in the practice of this invention. Substituted butadienes are commercially available from, for example, Atlantic-Richfield under the trademark "Poly B-D", a series of hydroxy-terminated butadiene polymers; for example, use can be made of hydroxy-terminated butadiene homopolymers like Poly B-D R-15M which has a hydroxy number of 42 or Poly B-D R-45M.

Preferably, the rubber polymer is an elastomeric material formed by copolymerization of one or more conjugated dienes with one or more ethylenic monomers, such as styrene as well as hydroxy, amino and mercapto-substituted derivatives thereof, acrylonitrile, methacrylonitrile, acrylic acid, methacrylic acid, etc. Included are butadiene-styrene rubbers, butadiene-acrylonitrile rubbers, etc. Hydroxy-terminated copolymers are likewise useful in the practice of this invention, including the hydroxy-terminated butadiene-styrene copolymer designated "Poly B-D CS-15" and hydroxy-terminated butadiene-acrylonitrile copolymers like Poly B-D CN-15 having a hydroxyl number of 39. Preferred are butadiene-styrene rubbers like SOLPRENE 1205C available from Phillips Petroleum.

An especially suitable chemically modified asphalt which is the reaction product of asphalt, a vinyl aromatic monomer, and a rubbery polymer is that available commercially from Owens-Corning Fiberglas Corporation under their ROADBOND trademark.

The first chemically modified asphalt, that is the asphalt produced by reacting asphalt with a vinyl aromatic monomer and an amine of an acyclic unsaturated hydrocarbon is more fully described in co-pending application U.S. Ser. No. 329,901 which is hereby incorporated by reference. The asphalt employed in making such chemically modified asphalt and the vinyl aromatic monomer employed in making such chemically modified asphalt may be any of those described above with respect to the vinyl aromatic monomer and asphalt. Preferably, styrene is employed in both instances. The amounts of the ingredients employed may vary over a wide range, but in general, it will be preferred to employ the vinyl aromatic monomer in an amount of about 1% to about 10% based on the weight of asphalt and to employ the acyclic unsaturated hydrocarbon amine in an amount of about 2% to about 10% based on the weight of asphalt. Most desirably, the vinyl aromatic monomer will be about 2% to about 5% and the amine about 5% to about 7%.

The amines employed in forming the first chemically modified asphalt are amines of unsaturated acyclic hydrocarbons. The unsaturation in these compounds provides reactive sites for chemically integrating the amines into the compositions and the amine functionality provides the desired polarity, or functionality, so as to form cationic compositions which will exhibit tenacious bonding to aggregate commonly employed in the highway maintenance and repair industry, as well as cementitious and other substrates. Preferably, the hydrocarbon portion of the amine will contain 8 to 25 carbon atoms. Thus, the hydrocarbon can include such groups as alkenyl, alkadienyl, alkatrienyl, alkatetraenyl, and alkapentaenyl radicals. The preferred hydrocarbon radicals will be found to be octadecenyl radicals, for example a 9 octadecenyl radical or octadecadienyl radicals, for example a 9,12 octadecadienyl radical or octadecatrienyl radicals, for example the 9,12,15 octadecatrienyl radical. Representative of other suitable amines include: the decenyl amines, for example 9 decenyl amine; decadienyl amines, for example 2,4 decadienyl amine; dodecenyl amine, for example 9 dodecenyl amine; hexadecenyl amine, for example 9 hexadecenyl amine; 9,11,13,15 octadecatetraenyl amine; 6,9,12,15 octadecatetraenyl amine; 9,11,13 octadecatrienyl amine; 9,12,15 octadecatrienyl amine; 6 octadecenyl amine; 11 octadecenyl amine; eicosenyl amines, for example 9 eicosenyl amine and 11 eicosenyl amine; eicosatetraenyl amines, for example 8,11,14,17 eicosatetraenyl amine and 5,8,11,14 eicosatetraenyl amine; eicosapentaenyl amines like 5,8,11,14,17 eicosapentaenyl amine; docosenyl amines, for example 11,13 docosenyl amine; docasapentaenyl amines, for example 7,10,13,16,19 docasapentaenyl amine; and tetracosenyl amines, for example, 15 tetracosenyl amine. Of course, it will be appreciated that mixtures of such unsaturated acyclic hydrocarbon amines may be employed, and in fact in a preferred mode of practicing the present invention, such a mixture is employed.

The above-indicated amines are commercially available. One suitable source for such amines is Humko Chemical division of Witco Chemical Company, which supplies these amines under the trade name Kemamine. Those amines are manufactured by converting fatty acids to nitriles followed by reduction, for example, by hydrogenation, to the amines. Thus, as will be apparent, these amines may also be viewed upon as derivatives of fatty acids. Thus, the preferred amines as indicated above may be viewed upon as oleyl amine, linoleyl amine, and linolenyl amine, or mixtures thereof. Suitable amines which are commercially available are represented by Kemamine P-997, P-997D, and P-999. These amines generally have melting point ranges varying between about 10° C. to about 60° C., with the preferred amines having melting point ranges between about 15° C. to about 26° C. If desired, saturated acyclic hydrocarbon amines may also be employed, for example, those having 8 to 25 carbon atoms in the hydrocarbon chain. In fact, the preferred amines, namely P-997, P997D and P-999, are mixtures of several unsaturated acyclic hydrocarbon amines and saturated acyclic hydrocarbon amines. For example, P-999 amine contains approximately 57% by weight of oleyl amine, 15% by weight linoleyl amine, 7% by weight of linolenyl amine, about 2% by weight of gadoleyl amine, 15% by weight of palmityl amine, and 4% by weight of stearyl amine. The P-997 and P-997D amines contain about 45% by weight of oleyl amine, 30% by weight linoleyl amine, about 15% by weight of palmityl amine, and about 10% by weight of stearyl amine. The above-indicated commercially available amines are typically about 93% to about 97% amine by weight.

The reacting to produce the second chemically modified asphalt is done by heating at an elevated temperature for several hours, such as for example at a temperature of at least about 120° C. for at least about 10 hours, and most desirably at about 120°–180° C. for about 24 hours. It is believed that because of the unsaturation of the vinyl aromatic monomer the acyclic unsaturated hydrocarbon amine and the known presence of double bonds in asphalt that the constituents are chemically incorporated into each other by means of these reactive sites.

The amount of the first and second chemically modified asphalts which are employed in the present invention may vary over wide ranges, but it is generally preferred to employ a weight ratio of about 5:95 to about 95:5 (the ratio being the ratio of the asphalt produced by reacting asphalt with a vinyl aromatic monomer and the acyclic unsaturated hydrocarbon amine to the asphalt produced by heating asphalt with the vinyl aromatic monomer and a rubbery polymer).

While the above describes the present invention with sufficient particularity to allow those skilled in the art to make an use same, nonetheless there follows further exemplification of the manner of practicing this invention.

EXAMPLE

A formulation of approximately 90.6% by weight of AC-20 asphalt, about 3.1% by weight styrene, and about 6.3% by weight of Kemamine P-999 are employed. The asphalt is charged into the reactor and heated to approximately 110° C. at which point the styrene is added. Upon completion of the styrene addition, the Kemamine P-999 is added while heating to approximately 150° C. With agitation and under reflux, the mixture is then reacted by heating at 150° C. for about 24 hours after which the product is recovered and cooled.

About 60 parts by weight of the above chemically modified asphalt was heated to about 140° C. with stirring and to that composition there was then added about 40 parts by weight of a chemically modified asphalt produced by reacting a vinyl aromatic monomer and a rubbery polymer (the product available from Owens-Corning Fiberglas Corporation under their trade designation ROADBOND).

The foregoing blend is outstandingly adapted for the numerous and wide variety of uses previously set forth.

While the foregoing describes the present invention, it will, of course, be apparent that modifications are possible which pursuant to the patent statutes and laws do not depart from the spirit and scope hereof.

We claim:

1. As a composition of matter, a blend of
   (i) the product produced by reacting asphalt with a vinyl aromatic monomer and an amine of an acyclic unsaturated hydrocarbon, and
   (ii) the product produced by reacting asphalt with a vinyl aromatic monomer and a rubbery polymer.

2. The composition of claim 1 wherein said hydrocarbon as 8–25 carbon atoms.

3. The composition of claim 2 wherein said amine is at least one member selected from the group consisting of oleyl amine, linoleyl amine and linolenyl amine.

4. The composition of claim 2 wherein said rubbery polymer is a homopolymer of a diene or a copolymer of a diene and an olefinically unsaturated monomer.

5. The composition of claim 4 wherein said vinyl monomer is styrene.

6. In a composition of matter comprising a chemically modified asphalt product produced by reacting asphalt with a vinyl aromatic monomer and a rubbery polymer, the improvement comprising in admixture therewith, the product produced by heating at a temperature of at least about 120° C. for at least about ten hours asphalt with a vinyl aromatic monomer and an amine of acyclic unsaturated hydrocarbon.

7. The improvement of claim 6 wherein said heating is done at a temperature of about 120° to about 180° C.

8. The composition of claim 7 wherein each of said vinyl aromatic monomers is styrene and wherein said rubbery polymer is a homopolymer of a diene or a copolymer of a diene and an olefinically unsaturated monomer.

* * * * *